UNITED STATES PATENT OFFICE.

OTTO ZWIETUSCH, OF MILWAUKEE, WISCONSIN.

IMPROVEMENT IN COATING STONEWARE TO PROTECT IT AGAINST ACIDS.

Specification forming part of Letters Patent No. 150,994, dated May 19, 1874; application filed April 20, 1874.

*To all whom it may concern:*

Be it known that I, OTTO ZWIETUSCH, of Milwaukee, Wisconsin, have invented a new and valuable Process for Preserving Stoneware against the action of Acids, or preventing acids from sweating through its pores, of which the following is a clear, full, and exact description:

It is a well-recognized fact that with the exception of glass, stoneware is the only material in which acids can be kept; but such acids, as muriatic, sulphuric, nitric, &c., are more or less liable to destroy the glazing of the stoneware and then pass through its pores.

The object of my invention is to prevent or overcome this difficulty, and to render stoneware perfectly secure as a vessel for holding acids; and it consists in a process of boiling the stoneware in a solution of materials which are not affected by acids.

To enable others skilled in the art to use my invention, I will proceed to describe the exact manner in which I have carried it out.

I take a heated solution of paraffine, spermaceti, or other similar material, kept at boiling-point, and into this I place the stoneware to be treated, and there allow it to remain until all atmospheric air is driven out of the pores by the heat, and this result has been reached when no more small bubbles pass upward through the solution. The solution will then have filled all the pores of the stoneware, and will remain there, and when cold the article will be found to be perfectly tight.

In preparing the solution of paraffine, I sometimes add a small quantity of gutta-percha or beeswax.

Having thus described my invention, what I claim as new, and desire to secure by Letters Patent, is—

The process herein described to preserve stoneware against the action of acids by boiling it in a solution of paraffine or other materials which are not affected by acids.

OTTO ZWIETUSCH.

Witnesses:
    JOHN G. HIRSCH,
    ED. E. BORGNIS.